United States Patent
Lin et al.

(10) Patent No.: US 7,735,124 B2
(45) Date of Patent: Jun. 8, 2010

(54) PASSWORD INPUT AND VERIFICATION METHOD

(75) Inventors: Chyi-Yeu Lin, Taipei (TW); Huan-Wen Chen, Bali Township, Taipei County (TW); Tsung-Yu Hung, Linkou Township, Taipei County (TW); Chia-Hum Ho, Jhonghe (TW); Han-Tien Chen, Taishan Township, Taipei County (TW); Tsung-Han Lee, Danshuei Township, Taipei County (TW)

(73) Assignee: Chyi-Yeu Lin, Taipei (TW)

( * ) Notice: Subject to any disclaimer, the term of this patent is extended or adjusted under 35 U.S.C. 154(b) by 1362 days.

(21) Appl. No.: 11/089,344

(22) Filed: Mar. 24, 2005

(65) Prior Publication Data
US 2006/0215360 A1    Sep. 28, 2006

(51) Int. Cl.
*G06F 7/04*    (2006.01)
(52) U.S. Cl. .................. 726/7; 726/3; 726/5; 726/16
(58) Field of Classification Search ............... 726/3, 726/5, 7, 16
See application file for complete search history.

(56) References Cited

U.S. PATENT DOCUMENTS

| | | | |
|---|---|---|---|
| 5,428,349 A | 6/1995 | Baker | 340/5.54 |
| 6,209,104 B1 | 3/2001 | Jalili | 713/202 |
| 6,658,574 B1 | 12/2003 | Anvekar | 713/202 |
| 2005/0010768 A1* | 1/2005 | Light et al. | 713/168 |
| 2006/0041756 A1* | 2/2006 | Ashok et al. | 713/183 |
| 2006/0041759 A1* | 2/2006 | Kaliski et al. | 713/184 |

FOREIGN PATENT DOCUMENTS

| | | |
|---|---|---|
| EP | 1708110 A1 | 4/2006 |
| JP | 2005115429 | 10/2006 |

* cited by examiner

*Primary Examiner*—Michael Pyzocha
*Assistant Examiner*—Tamara Teslovich
(74) *Attorney, Agent, or Firm*—Morris, Manning & Martin LLP; Tim Tingkang Xia

(57) ABSTRACT

A password input and verification method is provided to prevent the disclosing of the password from peeping. The method is easy to learn, transparent to the users, and requires no hardware change and only minor software modification. The method allows a user to enter a much longer string of characters when he or she is asked for the password. The user is then authenticated if the actual password is embedded as a whole anywhere within the input string. The method also provides a mechanism called prohibition key. A prohibition key is a predetermined character that, when present in the user input string, the user is not authenticated regardless of whether the actual password is contained in the input string or not.

14 Claims, 2 Drawing Sheets

PASSWORD INPUT AND VERIFICATION METHOD

BACKGROUND OF THE INVENTION

1. Field of the Invention

The present invention generally relates to user authentication, and more particularly to a password input and verification method for authenticating a user's identity.

2. The Prior Arts

Using password to authenticate a person's identity when he or she is requesting privileged information, services, or resources is the most commonly used security mechanism in people's daily life. Even though, as the technology advances, various new mechanisms such as using fingerprint, voice, or even retina have been proposed and applied in real life, the password-based authentication remains the most popular one, as it is effective, reliable, and simple.

Password is usually entered through a keyboard or keypad to a system and a display is often associated with such system. The user's key entry is not revealed on the display, but an asterisk "*" or some similar character is displayed in response to each entry of a character. Despite that, it is possible for a near-by observer to peek and copy the sequence of key entries.

Using a longer password is effective against peeping in that people tend to be not able to memorize correctly a long string of characters. This, however, applies to the user as well; the user would also find it difficult to memorize his or her own password. A password containing four to six alphanumeric characters is considered to be most easy to remember.

There are already a number of approaches proposed to guard against the disclosing of the password during its entry using traditional mechanism, such as those revealed in U.S. Pat. Nos. 5,428,349, 6,209,104, and 6,658,574. These solutions are all effective to some extent but, nevertheless, they present other shortcomings such as difficult to learn and comprehend by ordinary users, requiring special hardware and/or major software change to implement, etc.

SUMMARY OF THE INVENTION

Accordingly, the present invention provides a password input and verification method directed to prevent the disclosing of the password from peeping and to obviate the shortcomings of prior arts as well.

The major objectives of the present invention are as follows. The password input and verification method, when implemented, shouldn't require any hardware change. The existing hardware could be used for the password entry as before. In addition, the software for the authentication system should undergo minimum and straightforward change for implementing the method of the present invention. The method of the present invention should also be very easy to learn and understand for ordinary users.

Another objective, and the greatest feature as well, of the present invention is that, if a user does not know about the new password input method or is not interested in using it, the user could enter the password as usual, and the user should be authenticated as before. This is a very valuable feature as the system transition from using the existing method to the new method of the present invention is entirely transparent to the users.

To achieve the foregoing objectives, the method of the present invention allows a user to enter a much longer string of characters when the user is asked for his or her password. The user is then authenticated if the actual password is embedded as a whole anywhere within the input string, regardless of its position within the input string. As a longer string is entered, it would be difficult for a peeper to memorize the long key sequence correctly. If the user simply enters the actual password as is without any extraneous characters, the user would still be authenticated and, therefore, the user wouldn't notice any difference. There is no hardware change required. More over, for anyone having some basic knowledge about programming, the software change is obviously very minor.

To further enhance the security of the authentication system and to prevent unauthorized persons from using trial and error to guess the actual password, the method of the present invention provides a mechanism called prohibition key. A prohibition key is a predetermined character agreed by a user and the authentication system that, when the prohibition key is present in the user input string, the user is not authenticated regardless of whether the actual password is contained as a whole in the input string or not.

The foregoing and other objects, features, aspects and advantages of the present invention will become better understood from a careful reading of a detailed description provided herein below with appropriate reference to the accompanying drawings.

DETAILED DESCRIPTION OF THE PREFERRED EMBODIMENTS

In the following, detailed description along with the accompanied drawings is given to better explain preferred embodiments of the present invention.

In a first embodiment of the present invention, a password S required by an authentication system implementing the present embodiment is a string composed of a fixed number of characters selected from an alphanumeric set A: {0~9, a~z}. The length L of the password S (i.e., the number of characters it contains) and the alphanumeric set A is pre-determined by the authentication system and applies to all users of the authentication system. Please note that, in some embodiments of the present invention, the password could be case-sensitive or of variable length, and a different alphanumeric set could be used. These variations, however, do not affect the applicability of the present invention. A user's password, once set by the user, is stored for later retrieval by the authentication system.

Figure 1:
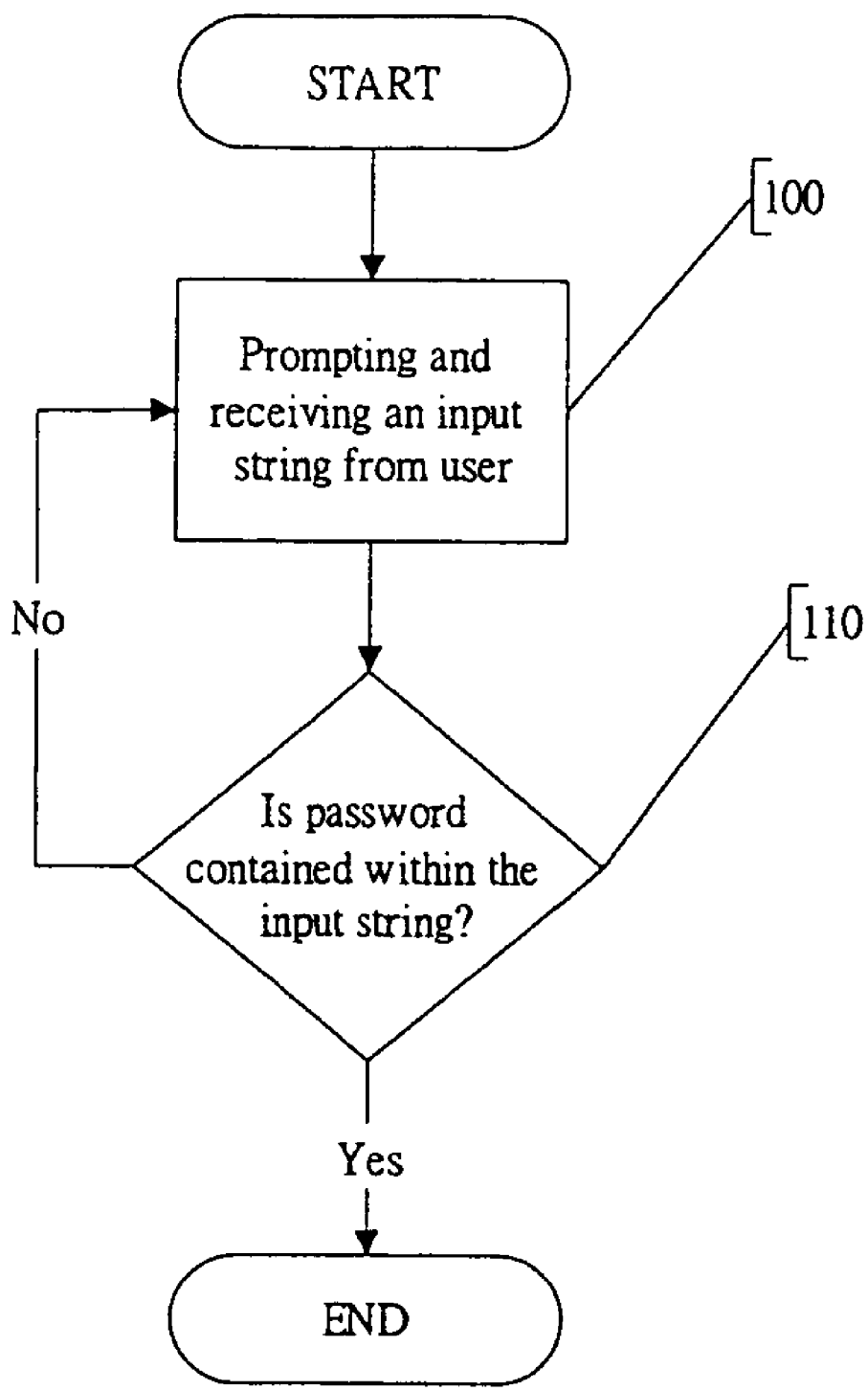
FIG. 1 is a flow chart showing the operation steps of a first embodiment according to the present invention.

FIG. 1 is a flow chart showing the operation steps of a first embodiment according to the present invention. As illustrated, when asked for his or her password in step 100, the user enters a string S' into the authentication system via an input mechanism provided by the authentication system. Various input mechanisms could be used and includes (but is not limited to) keyboard, keypad, voice recognition of pronounced characters, handwriting recognition of using a stylus to write down characters on a digitizer, using a pointing device to point and click on a virtual keyboard displayed on a display. Usually there is a display associated with the authentication system for showing the characters entered and these characters are usually disguised.

In some embodiments, before asking for the password, the authentication system might ask the user to enter his or her User ID in advance. The authentication system then, based on the User ID, is able to retrieve the stored password for the user. Please note that sometimes a User ID is entered transparently into the authentication system without a user's involvement. For example, the User ID might be encoded in a magnetic stripe behind an ATM card and, when the card is inserted into the teller machine, the User ID is retrieved from the magnetic stripe. Another example is that, for some telecommunications services, the phone number of a user's mobile handset or landline phone is entered into the authentication system as the User ID via the Caller ID mechanism. There are also some embodiments where the authentication systems do not ask for the password but actually always stand by for receiving user entries. The keypad locks commonly found at door sides are one such example, where a user just punches his or her password on the keypad and the door is open if the password is accepted. Please also note that the input string S' might have a length L' equal to, shorter than, or longer than the length L. And the end of entering the input string S' is usually signaled by the user's pressing, for example, an Enter key or the "#" key, or the end of entering the input string S' is automatically determined by the authentication system after a pre-determined timeout period.

Then, in step 110, the input string S' is examined to see if the user could be authenticated. In the present embodiment, the input string S' is accepted and considered a correct "password" if the input string S' satisfies any one of the following conditions:

$S'=S''+S$, or $S'=S+S'''$, or $S'=S''+S+S'''$, or $S'=S$.

S'' and S''' are strings of characters selected from the alphanumeric set A having a length at least one. In plain English, the input S' is accepted only if it is exactly the same as the password S, or the password S is contained as a whole within the input string S'.

For example, if the password S is "1234," then the following input strings S' are all accepted: "1234def," "abc1234," "abc1234def," and "1234." Instead, the following input strings S' are not accepted: "123," "12334," and "abc12de34f."

Based on the present embodiment, the user now could enter a much longer string as a valid "password", which could effectively prevent a near-by peeper from memorizing the key sequence the user uses. If the user enters the exact password S, he or she would still be authenticated as well, so that the present embodiment could be totally transparent to all users. Please note that the present embodiment indeed could not guard against the situation that the user's key sequence is video-taped by a hidden camera. However this shouldn't be considered a defect as, first, most password-based methods are subject to such threat as well; secondly, the user could protect himself or herself by somewhat covering his or her finger movement when such a video-taping threat apparently presents.

Figure 2:
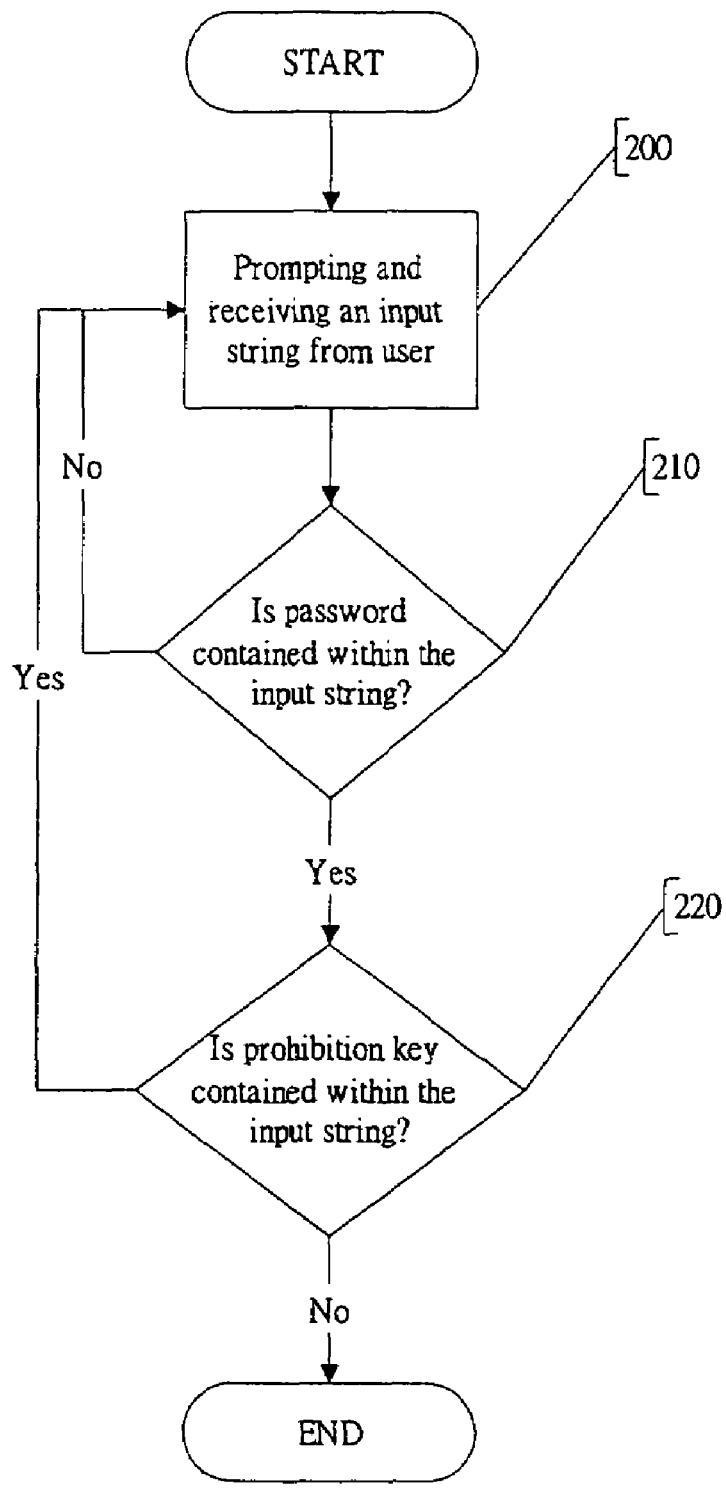
FIG. 2 is a flow chart showing the operation steps of a second embodiment according to the present invention.

FIG. 2 is a flow chart showing the operation steps of a second embodiment according to the present invention. In the present embodiment, a special character C of the alphanumeric set A is designated by the user as a prohibition key. Each user could have his or her own prohibition key, and the prohibition key C is stored along with the user's password S.

As illustrated, steps 200, 210 are identical to steps 100, 110 of the previous embodiment and the description is omitted here. However, unlike step 110 which immediately accepts the input string S' if it satisfied the four conditions. In the present embodiment, an additional step 220 is performed before actually accepting the input string S'. In step 220, the input string S' is further examined to see if it satisfies the following condition:

$C \notin S'$.

In plain English, the input string S' is accepted only if it does not contain any prohibition key, and either S' is exactly the same as the password S, or the password S is contained as a whole within the input string S'. Please note that, in some embodiments, steps 210 and 220 could be swapped in terms of execution order, or the two steps could be combined in a single step.

For example, if the password S is "1234" and the prohibition key C is "e," then the following input strings S' are all accepted: "abc1234," and "1234." Instead, the following input strings S' are not accepted: "1234def," and "abc1234def."

Please note that a user's password S shouldn't contain the prohibition key otherwise the user would never be authenticated. Please also note that, in some embodiments, a user might designate more than one character as prohibition keys. From the description above, it could be understood that the use of prohibition key(s) could significantly reduce the chance that a peeper may break through the authentication system with a partially correct key sequence and by trial and error.

The present invention could be adopted in various applications and applied with various scenarios. For example, the present invention could be used in an ATM teller machine or similar financial transaction system, a computer system or a software program, a safety box, a home or office security system. If the peeper accidentally tries a string containing the correct password but having one or more prohibition keys, the string would be rejected, which would adds up the peeper's frustration in breaking the authentication system.

As illustrated in both FIGS. 1 and 2, when the input string S' is not accepted for any reason, the operation of the two embodiments return to the initial steps 100 and 200 to wait for another user entry. In some embodiments, if a user has failed to enter an acceptable input string S' up to a predetermined number of times, some action could be carried out by the authentication system. If the present invention is applied in a bank teller machine, an example of the action is that the ATM card is confiscated. If the present invention is applied in a computer system, the action could be locking the user account or rejecting further login attempts for the user up to a period of time. As the action adopted is very application-specific and is not considered part of the present invention, they are omitted from both FIGS. 1 and 2.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A password input and verification method of a financial transaction system for a user to enter a string of characters for authentication against a password pre-set in said financial transaction system, comprising the steps of:

prompting said user by an automatic teller machine to enter the string of characters for authentication against said password;

obtaining said string of characters entered by said user by automatic teller machine;

comparing said string of characters with said password, wherein comparing includes examining said string of characters for each of the following four conditions:

said password as a whole is a prefix of said string of characters;

said password as a whole is an infix of said string of characters;

said password as a whole is a suffix of said string of characters, and said password as a whole is an exact match to said string of characters; and authenticating said user and permitting said user to conduct transaction through said automatic teller machine if said string of characters satisfies any of the four conditions.

2. The password input and verification method as claimed in claim 1, wherein said password and said string of characters are sequence of characters selected from a predetermined alphanumeric set.

3. The password input and verification method as claimed in claim 1, wherein said method further comprises the following step before prompting said user to enter said string of characters:

obtaining another string of characters by said automatic teller machine as a User ID for retrieving said user's said password from said financial transaction system.

4. The password input and verification method as claimed in claim 3, wherein said User ID is stored in a card read by said automatic teller machine.

5. A password input and verification method of a financial transaction system for a user to enter a string of characters for authentication against a password and at least a prohibition key pre-set in said financial transaction system, comprising the steps of:

prompting said user by an automatic teller machine to enter a string of characters for authentication against said password;

obtaining said string of characters entered by said user by said automatic teller machine;

comparing said string of characters with said password, wherein comparing includes examining said string of characters for each of the following four conditions:

said password as a whole is a prefix of said string of characters, and said prohibition key is not contained in said string of characters;

said password as a whole is an infix of said string of characters, and said prohibition key is not contained in said string of characters;

said password as a whole is a suffix of said string of characters, and said prohibition key is not contained in said string of characters; and said password as a whole is an exact match to said string of characters, and said prohibition key is not contained in said string of characters; and authenticating said user and permitting said user to conduct transaction through said automatic teller machine if said string of characters satisfies any of the four conditions.

6. The password input and verification method as claimed in claim 5, wherein said password, said prohibition key, and said string of characters are sequence of characters selected from a predetermined alphanumeric set.

7. The password input and verification method as claimed in claim 5, wherein said method further comprises the following step before prompting said user to enter said string of characters:

obtaining another string of characters by said automatic teller machine as a User ID for retrieving said user's said password and said prohibition key from said financial transaction system.

8. The password input and verification method as claimed in claim 7, wherein said User ID is stored in a card read by said automatic teller machine.

9. A password input and verification method of a software system for a user to enter a string of characters for authentication against a password pre-set in said software system, comprising the steps of:

prompting said user on a display to enter a string of characters for authentication against said password;

obtaining said string of characters entered by said user via a keyboard;

comparing said string of characters with said password, wherein comparing includes examining said string of characters for each of the following four conditions:

said password as a whole is a prefix of said string of characters;

said password as a whole is an infix of said string of characters;

said password as a whole is a suffix of said string of characters; and said password as a whole is an exact match to said string of characters; and authenticating said user and permitting said user to access said software system if said string of characters satisfies any of the four conditions.

10. The password input and verification method as claimed in claim 9, wherein said method further comprises the following step:

obtaining another string of characters entered by said user via said keyboard as a User ID for retrieving said user's said password from said software system.

11. The password input and verification method as claimed in claim 10, wherein said method further comprises the following step:

prompting said user on said display to enter said another string of characters as said User ID.

12. A password input and verification method of a software system for a user to enter a string of characters for authentication against a password and at least a prohibition key pre-set in said software system, comprising the steps of:

prompting said user on a display to enter a string of characters for authentication against said password;

obtaining said string of characters entered by said user via a keyboard;

comparing said string of characters with said password, wherein comparing includes examining said string of characters for each of the following four conditions:

said password as a whole is a prefix of said string of characters, and said prohibition key is not contained in said string of characters;

said password as a whole is an infix of said string of characters, and said prohibition key is not contained in said string of characters;

said password as a whole is a suffix of said string of characters, and said prohibition key is not contained in said string of characters; and said password as a whole is an exact match to said string of characters, and said prohibition key is not contained in said string of characters; and authenticating said user and permitting said user to access said software system if said string of characters satisfies any of the four conditions.

13. The password input and verification method as claimed in claim 12, wherein said method further comprises the following step:

obtaining another string of characters entered by said user via said keyboard as a User ID for retrieving said user's said password and said prohibition key from said software system.

14. The password input and verification method as claimed in claim 13, wherein said method further comprises the following step:

prompting said user on said display to enter said another string of characters as said User ID.

* * * * *